United States Patent
Taoda et al.

(10) Patent No.: US 6,291,067 B1
(45) Date of Patent: *Sep. 18, 2001

(54) PHOTOCATALYTIC POWDER FOR ENVIRONMENTAL CLARIFICATION AND POWDER-CONTAINING POLYMER COMPOSITION THEREOF

(75) Inventors: Hiroshi Taoda, 4-301 Inokoshi-jutaku, 1-70 Heiwagaoka, Meito-ku; Toru Nonami, 1-302 Inokoshi-jutaku, 1-70 Heiwagaoka, Meito-ku, both of Nagoya, Aichi, 465-0097; Katsura Ito; Hiroyuki Hagihara, both of Shiojiri, all of (JP)

(73) Assignees: Japan as represented by Director General of the Agency of Industrial Science and Technology; Showa Denko Kabushiki Kaisha, both of Tokyo; Hiroshi Taoda; Toru Nonami, both of Aichi, all of (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/617,029

(22) Filed: Jul. 14, 2000

Related U.S. Application Data

(63) Continuation of application No. 09/220,762, filed on Dec. 28, 1998, now Pat. No. 6,090,736.
(60) Provisional application No. 60/088,881, filed on Jun. 11, 1998.

(30) Foreign Application Priority Data

Dec. 25, 1997  (JP) .................................................... 9-366295

(51) Int. Cl.$^7$ ............................. B32B 27/02; B01J 20/04; B01J 21/06; B01J 27/18; B01J 37/025
(52) U.S. Cl. ........................ 428/375; 428/378; 428/380; 428/384; 502/208; 502/350; 502/402; 502/522; 523/125
(58) Field of Search ................................. 522/28, 29, 66, 522/84; 502/5, 159, 208, 349, 350, 242, 402, 522; 526/908; 523/125, 126; 428/375, 378, 380, 384

(56) References Cited

U.S. PATENT DOCUMENTS 4,520,124 * 5/1985 Abe et al. .
4,954,465   9/1990 Kawashima et al. .
5,178,901 * 1/1993 Toriyama et al. .
5,229,488   7/1993 Nagasuna et al. .
5,468,699  11/1995 Zhang et al. .
5,547,823   8/1996 Murasawa et al. .
5,658,841 * 8/1997 Tanaka et al. .
5,690,922  11/1997 Mouri et al. .
5,712,461 * 1/1998 Zhang et al. .
5,981,425  11/1999 Taoda et al. .
5,981,426  11/1999 Langford et al. .
6,037,289   3/2000 Chopin et al. .
6,071,527 * 6/2000 Tsujino et al. .
6,090,736 * 7/2000 Taoda et al. .

FOREIGN PATENT DOCUMENTS 4-308513   10/1992  (JP) .
7-171408    7/1995  (JP) .
7-241475    9/1995  (JP) .
7-316342   12/1995  (JP) .
8-182934    7/1996  (JP) .
8-284011   10/1996  (JP) .
9-31335     2/1997  (JP) .
9-78462     3/1997  (JP) .
9-225319    9/1997  (JP) .
9-225320    9/1997  (JP) .
9-225321    9/1997  (JP) .
9-225322    9/1997  (JP) .
9-239277    9/1997  (JP) .
10-5598     1/1998  (JP) .
10-8327     1/1998  (JP) .
10-81517    3/1998  (JP) .
10-168325   6/1998  (JP) .

* cited by examiner

*Primary Examiner*—Susan W. Berman
(74) *Attorney, Agent, or Firm*—Sughrue, Mion, Zinn, Macpeak & Seas, PLLC

(57) ABSTRACT

A photocatalytic powder for environmental clarification, comprising finely divided titanium dioxide particles having a coating of porous calcium phosphate formed on at least part of the surface of each titanium dioxide particle, wherein an anionic surface active agent is present at least on the interface between said coating of porous calcium phosphate and the titanium dioxide particle. This photocatalytic powder is produced by dispersing finely divided titanium dioxide particles in an aqueous slurry containing an anionic surface active agent, and then forming a coating of porous calcium phosphate on at least part of the surface of each titanium dioxide particle. This photocatalytic powder is used, for example, by supporting it in an organic polymer shaped article.

15 Claims, No Drawings

PHOTOCATALYTIC POWDER FOR ENVIRONMENTAL CLARIFICATION AND POWDER-CONTAINING POLYMER COMPOSITION THEREOF

CROSS REFERENCE TO RELATED APPLICATIONS

This is a continuation of application Ser. No. 09/220,762 filed Dec. 28, 1998 now U.S. Pat. No. 6,090,736, the entire disclosure of which is incorporated herein by reference.

This application is an application filed under 35 U.S.C. §111(a) claiming benefit pursuant to 35 U.S.C. §119(e)(1) of the filing date of the Provisional Application No. 60/088,881 filed Jun. 11, 1998 pursuant to 35 U.S.C. §111(b).

BACKGROUND OF THE INVENTION (1) Field of the Invention

This invention relates to a photocatalytic powder, and a process for producing the powder, which is used as an environmental clarification material for removing malodors, decomposition-removing harmful substances or pollutants in air, effecting drainage or water purification, or killing bacteria or algae in water, which is particularly suitably used in the form such that the powder is incorporated in organic fibers or plastics by kneading or embedding. The invention further relates to a polymer composition comprising the photocatalytic powder, a shaped article made from the composition, and a process for making the shaped article.

(2) Description of the Related Art

For preventing or removing malodors or removing harmful substances in air, a method of absorbing these by an acid or alkali solution or adsorbent has heretofore been widely used in many fields. However, this method has a problem in the treatment of a waste solution or an adsorbent used which may cause secondary pollution. A method of concealing malodors using a fragrance may also be used, however, the odor of fragrance may soak into food, thus, this method has a fear of damages by the order of fragrance itself (see, for example, Konosuke Nishida, *Daihyakka-jiten (Encyclopedia)*, Vol. 1, p. 136, published by Heibon Sha (1984)).

When titanium oxide is irradiated with light, an electron having a strong reducing action and a positive hole having a strong oxidizing action are generated and a molecular seed coming into contact therewith is decomposed by the oxidation-reduction action. Using such an action, namely, photocatalytic action of titanium oxide, organic solvents dissolved in water, environmental pollutants such as agricultural chemicals and surface active agents, or harmful substances in air or malodors can be decomposition-removed. This method utilizes only titanium oxide and light and can be repeatedly used, and moreover, the resulting reaction product is a harmless carbon dioxide or the like. Furthermore, this method is more free of restriction on the reaction conditions such as temperature, pH, gas atmosphere and toxicity, as compared with the biological treatment using microorganisms, and is advantageous in that those, which are difficult to decompose or remove by the biological treatment, such as organic halogen-containing compounds or organophosphorus compounds, can be easily decomposed and removed.

However, in conventional researches on decomposition and removal of organic materials using photocatalysis of titanium dioxide, a titanium dioxide powder as it is has been used as the photocatalyst (see, for example, A. L. Pruden and D. F. Ollis, *Journal of Catalysis*, Vol. 82, 404 (1983); H. Hidaka, H. Jou, K. Nohara and J. Zhao, *Chemosphere*, Vol. 25, 1589 (1992); and Teruaki Kubo, Kenji Harada and Kei-ichi Tanaka, *Kogyo Yosui (Industrial Water)*, No. 379, 12 (1990)). Accordingly, there are difficulties in the handling or use, for example, the used photocatalyst is difficult to recover. Due to this, use of a titanium dioxide photocatalyst has been not easily realized in practice. To overcome this problem, use of a titanium dioxide catalyst by kneading it into fibers or plastics which are easy to handle has been attempted. However, not only the harmful organic materials or environmental pollutants but also the fibers or plastics themselves are readily decomposed by the strong photocatalytic action of titanium dioxide to cause serious deterioration. Thus, use of titanium dioxide photocatalyst by kneading it into fibers or plastics cannot be actually employed.

JP-A-9-239277 (the term "JP-A" as used herein means an "unexamined Japanese patent publication") has proposed a photocatalyst carrier comprising a titanium dioxide particle on which surface an optically inactive compound such as aluminum, silicon or zirconium is island-like supported. This proposed technique of treating the surface of a titanium dioxide particle with an optically inactive compound such as aluminum, silicon or zirconium to support the compound is a technique originally developed in the field of cosmetics or pigments so as to greatly reduce the catalytic activity of titanium dioxide. However, this method suffers from a contradiction such that when the reaction of titanium oxide with fibers or plastics is intended to prevent, the photocatalytic action is in turn greatly reduced at the same time. Furthermore, when the surface-treated titanium dioxide is used as a photocatalyst for a bactericidal or fungicidal material, since fungi scarcely adhere to the photocatalyst, for example, under running water, the photocatalytic effect is difficult to bring out, the efficiency is poor and the durability is inferior.

DISCLOSURE OF THE INVENTION

By taking account of the above-mentioned problems of conventional techniques, the first object of the present invention is to provide an environmental clarification powder which can effectively, economically and safely perform the environmental clarification such as removal of malodors, decomposition-removal of harmful substances or pollutants in air, drainage or water purification, and killing of fungi or molds, particularly when the powder is used after it is supported by kneading with or embedding in an organic polymer medium such as organic fibers or plastics, the powder can exhibit a photocatalytic action superior in view of durability without causing any deterioration of the organic polymer medium.

The second object of the present invention is to provide a process for producing such a photocatalytic powder for environmental clarification.

The third object of the present invention is to provide an organic polymer composition having incorporated therein such a photocatalytic powder for environmental clarification.

The fourth object of the present invention is to provide a polymer shaped article produced from the said organic polymer composition, and a process for making the polymer shaped article.

As a result of extensive researches for achieving the above-described objects, the present inventors have found that, when finely divided titanium dioxide particles are dispersion-treated in an aqueous slurry containing an anionic surface active agent, and then a coating of calcium phosphate is formed on at least part of the surface of each titanium dioxide particle, a calcium phosphate coating having enhanced durability can be obtained, and further that, since this coating is porous and has a property of adsorbing miscellaneous fungi, the photocatalytic function of the titanium dioxide particles is not impaired and, when the titanium dioxide particles are supported on an organic polymer medium, the durability of the medium is remarkably improved. The present invention has been accomplished based on these findings.

Thus, in one aspect of the present invention, there is provided a photocatalytic powder for environmental clarification, comprising finely divided titanium dioxide particles having a coating of porous calcium phosphate formed on at least part of the surface of each finely divided titanium dioxide particle, wherein an anionic surface active agent is present at least on the interface between said coating of porous calcium phosphate and the finely divided titanium dioxide particle.

In another aspect of the present invention, there is provided a process for producing a photocatalytic powder for environmental clarification, comprising dispersing finely divided titanium dioxide particles in an aqueous slurry containing an anionic surface active agent, and then forming a coating of porous calcium phosphate on at least part of the surface of each finely divided titanium dioxide particle.

In still another aspect of the present invention, there is provided a polymer composition comprising an organic polymer and about 0.01% to about 80% by weight, based on the weight of the polymer composition, of the above-mentioned photocatalytic powder for environmental clarification.

In a further aspect of the present invention, there is provided a process for making a polymer shaped article having an environmental clarification function, which comprises kneading the above-mentioned polymer composition in an extruder and extruding the polymer composition therefrom.

DESCRIPTION OF THE PREFERRED EMBODIMENTS

The photocatalytic powder for environmental clarification of the present invention is characterized in that an anionic surface active agent is present at least on the interface between a finely divided titanium dioxide particle and a porous calcium phosphate coating layer formed on at least part of the surface of the titanium dioxide particle. An anionic surface active agent is usually present not only on the interface between a titanium dioxide fine particle and a porous calcium phosphate coating layer formed on at least part of the surface thereof but also in the porous calcium phosphate coating layer.

Finely divided titanium dioxide particles used for the production of the photocatalytic powder for environmental clarification preferably have a crystal form mainly comprising an anatase form because of its high photocatalytic activity.

The finely divided titanium dioxide particles used in the present invention preferably have an average primary particle diameter in the range of from about 0.001 $\mu$m to about 0.2 $\mu$m. If the average primary particle diameter is smaller than about 0.001 $\mu$m, the efficient production is difficult to attain and this is not useful in practice, whereas if the average primary particle diameter exceeds about 0.2 $\mu$m, the performance as a photocatalyst greatly decreases. The average primary particle diameter is more preferably in the range of from about 0.005 $\mu$m to about 0.1 $\mu$m.

The production process of the titanium dioxide for use in the present invention is not particularly limited provided that the finely divided titanium dioxide particles produced have a photocatalytic ability, however, those obtained by the gaseous phase reaction starting from a titanium halide, namely, the gaseous oxidation and/or gaseous hydrolysis reaction of a titanium halide are preferred because of their excellent primary particle dispersibility. By the term "primary dispersion particle" as used herein we mean a state such that finely divided particles are not agglomerated with each other to any appreciable extent as observed, for example, by a transmission-type electron microscope.

In the process for producing the photocatalytic powder for environmental clarification of the present invention, finely divided titanium dioxide particles are dispersed in an aqueous slurry containing an anionic surface active agent, prior to the step of forming a porous calcium phosphate coating on the finely divided titanium dioxide particles. The term "anionic surface active agent" as used herein means those which exhibit remarkable surface activity at a relatively low concentration, in particular, those which are used for controlling the interfacial phenomenon and cause electrolytic dissociation in an aqueous solution so that an anion can be a main substance of the activator.

As specific examples of the anionic surface active agent, there can be mentioned carboxylate salts such as fatty acid soda soap, potassium oleate soap and alkyl ether carboxylate salts; sulfate salts such as sodium lauryl sulfate, sodium higher alcohol sulfate, triethanolamine lauryl sulfate, sodium polyoxyethylene lauryl ether sulfate and sodium polyoxyethylene alkyl ether sulfates; sulfonate salts such as sodium dodecylbenzenesulfonate, sodium alkylnaphthalenesulfonates, sodium alkyldiphenyl ether disulfonates, sodium alkanesulfonates and sodium salt of aromatic sulfonic acidformaldehyde condensate; and potassium alkylphosphates, sodium hexametaphosphate, and dialkylsulfosuccinic acids. These anionic surface active agents may be used either alone or as a combination of at least two thereof.

By pre-treating the finely divided titanium dioxide particles with an aqueous slurry containing an anionic surface active agent, the rate of deposition of calcium phosphate is enhanced and the deposition thereof can be completed within a reasonably short period of time in the step of forming a porous calcium phosphate coating. By allowing the presence of the anionic surface active agent at least on the interface between the titanium dioxide particle and the porous calcium phosphate coating, the adhesive force of the porous calcium phosphate coating to the titanium dioxide particle is enhanced.

The amount of the anionic surface active agent contained in the aqueous slurry as used for pre-treating the titanium dioxide particles is preferably in the range of from about 0.02 part to about 20 parts by weight, preferably from about 1 part to about 10 parts by weight, per 100 parts by weight of titanium dioxide. If the proportion of the anionic surface active agent is smaller than about 0.02 part by weight, the intended photocatalytic activity is difficult to obtain, whereas even if it exceeds about 20 parts by weight, the photocatalytic activity does not respond to the increased amount and this is not economical nor practical.

After the pre-dispersion treatment in aqueous slurry containing an anionic surface active agent, a coating of porous calcium phosphate is formed on at least part of the surface of a finely divided titanium dioxide particle. For forming a coating of porous calcium phosphate, a method of contacting a pseudo substance solution containing at least calcium ion and phosphate ion with the finely divided titanium dioxide particle whereby calcium phosphate is deposited on at least part of the surface of the titanium dioxide particle is usually employed.

By the term "pseudo substance solution" used herein we mean a treating solution capable of giving a precipitate of calcium phosphate which includes tricalcium phosphate $Ca_3(PO_4)_2$ and other calcium phosphate compounds represented by various rational formulae. The pseudo substance solution is prepared by dissolving, for example, NaCl, $NaHCO_3$, KCl, $K_2HPO_4.3H_2O$, $MgCl_2.6H_2O$, and $CaCl_2$ with $Na_2SO_4$ or NaF in water. The pH is preferably adjusted with HCl or $(CH_2OH)_3CNH_2$ to a value of from about 7 to about 8, more preferably to a value of about 7.4. The pseudo substance solution used here preferably has a $Ca^{2+}$ ion concentration of from about 0.1 mM to about 50 mM and a phosphate ion concentration of from about 0.1 mM to about 20 mM. If the $Ca^{2+}$ ion or phosphate ion concentration is smaller than these ranges, it takes a long time for the precipitation of calcium phosphate, whereas if the concentration exceeds the above-described range, production of the precipitate abruptly occurs to an excessive extent and the porosity and coating thickness become difficult to control.

The porous calcium phosphate produced is not particularly limited provided that it is porous calcium phosphate composed of phosphate ion and calcium ion. The calcium phosphate is a compound having a fundamental unit represented by the formula $Ca_9(PO_4)_6$, and as specific examples of the calcium phosphate, there can be mentioned tricalcium phosphate $Ca_3(PO_4)_2$, hydroxyapatite $Ca_{10}(PO_4)_6(OH)_2$, dicalcium phosphate dehydrate $CaHPO_4.2H_2O$, octacalcium phosphate $Ca_8H_7(PO_4)_6.5H_2O$ and tetracalcium phosphate $Ca_4O(PO_4)_2$. Of these, hydroxyapatite is preferable and amorphous hydroxyapatite is especially preferable. The form of coating is not particularly limited, however, it is preferable that the coating uniformly covers the surface of a titanium dioxide particle.

The amount of porous calcium phosphate deposited on at least part of the surface of a titanium dioxide particle is preferably in the range of from about 0.01% to about 50% by weight based on the weight of titanium dioxide. If the amount of porous calcium phosphate is too small, its capacity of adsorbing harmful substances and malodorous substances is poor and the efficiency of decomposition-removing these substances is reduced. Further, the reduced amount of porous calcium phosphate tends to invite deterioration of a polymer medium having the photocatalytic powder supported thereon, with the result in reduction of durability of the photocatalytic activity. In contrast, if the amount of porous calcium phosphate is too large, the photocatalytic activity is manifested not to a sufficient extent.

After the formation of a coating of porous calcium phosphate is finally completed, the titanium dioxide slurry is dried to obtain a photocatalytic powder for environmental clarification.

The photocatalytic powder for environmental clarification of the present invention may comprise porous calcium phosphate-coated finely divided titanium dioxide particles supporting a metal such as platinum, rhodium, ruthenium, palladium, silver, copper, iron or zinc. In this case, the rate of oxidative decomposition of chemical substances further increases and the action of killing bacteria or algae is more intensified. The metal may also be supported onto finely divided titanium dioxide particles prior to the formation of a porous calcium phosphate coating.

In the photocatalytic powder for environmental clarification of the present invention, the calcium phosphate coating formed on at least part of the surface of a finely divided particle is porous, and thus, there are a multiplicity of pores in the coating within which there are regions at which the titanium dioxide is not covered with the calcium phosphate coating but is exposed, and the exposed titanium dioxide is capable of exhibiting photocatalytic activity for environmental clarification when irradiated with light. Upon irradiation with light, an electron and a positive hole are generated on the surface of the photocatalytic powder and exhibit oxidation-reduction action to thereby easily decomposition-remove organic substances as a source of malodors, harmful substances in air or organic compounds polluting the environment such as organic solvent or agricultural chemicals, adsorbed to calcium phosphate.

Thus, clarification of environment can be efficiently, economically and safely achieved, such as removal of malodors, decomposition-removal of harmful substances or pollutants in air, drainage or water purification, or killing of bacteria or molds.

Furthermore, the porous calcium phosphate coating having durability obtained by the above-described process prevents the direct contact of titanium dioxide with a supporting medium, and accordingly, even when the photocatalytic powder for environmental clarification is used in the form of being incorporated in an organic polymer medium such as an organic fiber or a shaped plastic article, for example, by kneading the powder into a polymeric material for the fiber or molded plastic article, the titanium dioxide is protected by the porous calcium phosphate coating and the deterioration of the fiber or plastics is prevented or minimized, and therefore, the powder's photocatalytic activity can continue for a long period of time.

Moreover, since the porous calcium phosphate coating has a property of adsorbing miscellaneous fungi, proteins, amino acids, bacteria or viruses in water or air, or nitrogen oxides and organic substances as a source of malodors, the miscellaneous bacteria or the like adsorbed by the porous calcium phosphate can be efficiently killed or decomposed by the strong oxidizing power of titanium dioxide generated upon irradiation with light. As the light source for the light irradiation, an artificial lamp such as fluorescent lamp, incandescent lamp, black light, UV lamp, mercury lamp, xenon lamp, halogen lamp or metal halide lamp, or sunlight may be used. By the oxidation-reduction action of an electron and a positive hole, which are generated in the titanium dioxide upon irradiation with light, proteins, amino acids, bacteria or viruses adsorbed by the porous calcium phosphate coating can be quickly and continuously decomposition-removed.

Especially, when the photocatalytic powder for environmental clarification of the present invention is used in the form of being supported in an organic polymer medium such as an organic fiber or a plastic article, by kneading or embedding the powder into the organic polymer medium, the organic fiber or plastic article can be prevented from decomposition even when harmful substances in air such as malodors or $NO_x$, or organic compounds polluting the environment such as organic solvents or agricultural chemicals dissolved in water are adsorbed and quickly and continuously decomposition-removed by the oxidation reduction action of the titanium dioxide by an electron and a positive hole generated upon irradiation with an artificial light such as fluorescent lamp, incandescent lamp, black light, UV lamp, mercury lamp, xenon lamp, halogen lamp or metal halide lamp, or sunlight.

This beneficial effect can be obtained merely by irradiating the polymer medium supporting the powder thereon with light, and accordingly, use of the environmental clarification powder of the present invention is advantageous in that the cost is low, the energy saving is attained and the maintenance can be dispensed with. Moreover, the polymer medium is not deteriorated and the polymer medium supporting the photocatalytic powder has an enhanced durability.

When the finely divided titanium dioxide particle used supports onto the surface thereof a metal such as platinum, rhodium, ruthenium, palladium, silver, copper, iron or zinc, the catalytic action of the metal further enhances the environmental clarification effect, such as decomposition-removal of organic compounds or killing of bacteria or molds.

The photocatalytic powder for environmental clarification of the present invention can be applied to a polymer shaped article such as an organic fiber or a shaped plastic article, composed of an organic polymer. The organic polymer used is not particularly limited, and, as specific examples thereof, there can be mentioned polyolefins such as polyethylene and polypropylene, polyamide such as nylon, polyvinyl chloride, polyvinylidene chloride, polyethylene oxide, polyethylene glycol, polyester such as polyethylene terephthalate, silicone resin, polyvinyl alcohol, vinyl acetal resin, polyacetate, ABS resin, epoxy resin, vinyl acetate resin, cellulose, cellulose derivatives, polyurethane, polycarbonate, polystyrene, urea resin, polyvinylidene fluoride and other fluororesins, phenol resin, celluloid, chitin and starch. A polymer shaped article such as an organic fiber or a plastic shaped article is obtained by shaping a polymer composition comprising an organic polymer and the photocatalytic powder for environmental pollution. In general, the photocatalytic powder is applied by means of kneading or embedding in an organic polymer during the production process of the polymer shaped article. A preferable process for making a polymer shaped article having an environmental clarification function comprises kneading a polymer composition comprising the photocatalytic powder and an organic polymer in an extruder and extruding the polymer composition therefrom. The concentration of the photocatalytic powder in the polymer composition is usually in the range of from about 0.01% to about 80% by weight, preferably about 1% to about 50% by weight, based on the total weight of the polymer composition.

The photocatalytic powder for environmental clarification of the present invention will now be described specifically by the following working examples.

In the working examples, the photocatalytic activity of the photocatalytic powder was evaluated by measuring an oxygen-absorption rate by the following method.

According to the method described in the article [Kato et al, Kogyou Kagaku Zasshi, 63, 5, 748–750 (1960)], a closed heat-resistant glass reactor having a volume of about 100 ml is charged with 20 ml of tetralin and 0.02 g of titanium dioxide. The suspended solution is irradiated with ultraviolet light at a constant reaction temperature of 40.1° C. in an oxygen atmosphere wherein the rate of oxygen absorption caused by the liquid phase oxidation reaction of tetralin is measured. Namely, the inner pressure of the reactor is measured by a differential pressure gauge at predetermined intervals of time to determine the rate of pressure change in mmHg/min. The photocatalytic activity is expressed by the thus-obtained rate of oxygen absorption (mmHg/min).

EXAMPLE 1

To 250 L of pure water, 600 g of commercially available polycarboxylic acid-type polymer surface active agent (POISE 530, supplied by Kao Corporation) was incorporated. Then, 12 kg of ultrafine titanium dioxide particles having an average primary particle diameter of 0.03 $\mu$m (F4, supplied by Showa Titanium KK) was poured there into effect the dispersion treatment.

Separately, NaCl, NaHPO$_4$, KH$_2$PO$_4$, KCl, MgCl$_2$.6H$_2$O and CaCl$_2$ as pseudo substances were incorporated into pure water. The amounts of the respective ingredients were adjusted so that the resulting pseudo substance solution, after a titanium dioxide slurry was mixed together, contained the pseudo substances at concentrations such that Na$^+$ was 139 mM, K$^+$ was 2.8 mM, Ca$^{2+}$ was 1.8 mM, Mg$^{2+}$ was 0.5 mM, Cl$^-$ was 144 mM and HPO$_4^-$ was 1.1 mM. 250 L of the titanium dioxide slurry obtained above and 350 L of the thus-obtained pseudo substance solution were mixed together and held while keeping the temperature at 40° C. for 24 hours. When 4 hours elapsed from the start of keeping the temperature at 40° C., the amount of calcium phosphate deposited was measured. This measurement revealed that about 90% by weight of calcium phosphate was deposited based on the total weight of the calcium phosphate finally deposited. Thereafter, the slurry was dried to obtain 10 kg of an environmental clarification powder. It was confirmed that the deposited product was a calcium phosphate containing hydroxyapatite.

The photocatalytic activity of the thus-obtained environmental clarification powder was evaluated utilizing the oxidation reaction of tetralin, and found to be as high as 10.0 mmH$_2$O/min. From 1 kg of the above-mentioned photocatalytic powder and a polyethylene terephthalate resin, a compound having a titanium dioxide concentration of 40% by weight was produced using a commercially available twin-screw extruder (KZW15-30MG, manufactured by Technobel KK). Upon irradiation with light, the compound obtained did not become colored nor deteriorated.

EXAMPLE 2

A photocatalytic powder for environmental clarification was produced by the same procedure as in Example 1 except that sodium alkylnaphthalenesulfonate (PELEX NB-L, supplied by Kao Corporation) was used as the anionic surface active agent with all other conditions remaining the same. Further, a compound (i.e., a resin composition) having a titanium dioxide concentration of 20% by weight was prepared from the photocatalytic powder and the same polyethylene terephthalate resin as used in Example 1. The photocatalytic powder obtained exhibited a photocatalytic activity of 10.3 mmH$_2$O/min, and, upon irradiation with light, the compound did not become colored nor deteriorated in a manner similar to in Example 1.

EXAMPLE 3

A photocatalytic powder for environmental clarification was produced by the same procedure as in Example 1 except that sodium hexametaphosphate (guaranteed reagent, supplied by Junsei Kagaku KK) was used as the anionic surface active agent with all other conditions remaining the same. Further, a compound having a titanium dioxide concentration of 20% by weight was prepared from the photocatalytic powder and the same polyethylene terephthalate resin as used in Example 1. The photocatalytic powder obtained exhibited a photocatalytic activity of 10.9 mmH$_2$O/min, and, upon irradiation with light, the compound did not become colored nor deteriorated in a manner similar to in Example 1.

EXAMPLE 4

A photocatalytic powder for environmental clarification was produced by the same procedure as in Example 1 except that ultrafine titanium dioxide particles having an average primary particle diameter of 0.06 im (F2 supplied by Showa Titanium KK) were used instead of the ultrafine titanium dioxide particles F4 with all other conditions remaining the same. The thus-obtained photocatalytic powder exhibited a photocatalytic activity of 9.8 mmH$_2$O/min. Further, a compound having a titanium dioxide concentration of 30% by weight was prepared from the photocatalytic powder and the same polyethylene terephthalate resin as used in Example 1. Upon irradiation with light, the compound did not become colored nor deteriorated in a manner similar to in Example 1.

EXAMPLE 5

A photocatalytic powder for environmental clarification was produced by the same procedure as in Example 1 except that the composition of the pseudo substance solution was varied so that the resulting solution, after it was mixed with the titanium dioxide slurry, contained the pseudo substances at concentrations such that Ca$^{2+}$ was 0.9 mM and HPO$_4^-$ was 9.6 mM with all other conditions remaining the same. The thus-obtained photocatalytic powder exhibited a photocatalytic activity of 11.1 mmH$_2$O/min. Further, a compound having a titanium dioxide concentration of 25% by weight was prepared from the photocatalytic powder and the same polyethylene terephthalate resin as used in Example 1. Upon irradiation with light, the compound did not become colored nor deteriorated in a manner similar to in Example 1.

Comparative Example 1

A photocatalytic powder for environmental clarification was produced by the same procedure as in Example 1 except that lauryl trimethylammonium chloride (KOHTAMIN 24P, supplied by Kao Corporation; which was a cationic surface active agent) was used instead of the anionic surface active agent with all other conditions remaining the same. The photocatalytic powder obtained exhibited a photocatalytic activity of 10.2 mmH$_2$O/min. A compound having a titanium dioxide concentration of 40% by weight was prepared from the photocatalytic powder and the same polyethylene terephthalate resin as used in Example 1. Upon irradiation with light, the compound became colored.

Comparative Example 2

250 L of titanium dioxide slurry was prepared from the same titanium dioxide particles as in Example 1 but the anionic surface active agent was not used. Thereafter, a pseudo substance solution was prepared, which had the same ion concentrations as in Example 1, and then, the pseudo solution was mixed with the titanium dioxide slurry. The mixture was heated at 40° C. When 24 hours elapsed from the start of the heating at 40° C., the deposition of calcium phosphate had not been completed. Then the heated mixture was dried to obtain a photocatalytic powder mainly comprised of titanium dioxide. The thus-obtained photocatalytic powder exhibited a photocatalytic activity of 11.5 mmH$_2$O/min. Then, a compound was prepared from the photocatalytic powder and the same polyethylene terephthalate resin as used in Example 1. Upon irradiation with light, the compound became colored and deteriorated.

Comparative Example 3

Into 600 L of pure water, 12 kg of ultrafine titanium dioxide particles having an average primary particle diameter of 0.03 μm (F4, supplied by Showa Titanium KK) was incorporated, and then, the mixture was stirred. Thereto, 1,800 g of an aqueous sodium aluminate solution (SA2019, supplied by Showa Denko KK) was added, and the mixed solution was treated so as to have a pH value of 7.5 by adding dropwise 0.3M sulfuric acid while keeping the temperature of 40° C. Then the resulting slurry was dried to obtain a photocatalytic powder comprised of titanium dioxide particles coated with aluminum oxide. The photocatalytic powder exhibited a photocatalytic activity as low as 8.5 mmH$_2$O/min. Further, a compound was prepared from this photocatalytic powder and the same polyethylene terephthalate as in Example 1. Upon irradiation with light, the composition became colored.

What is claimed is:

1. An organic polymer fiber having an environmental clarification function, which has supported thereon a photocatalytic powder for environmental clarification, said powder comprising finely divided titanium dioxide particles having a coating of porous calcium phosphate formed on at least part of the surface of each finely divided titanium dioxide particle, wherein an anionic surface active agent is present at least on the interface between said coating of porous calcium phosphate and the finely divided titanium dioxide particle.

2. The organic polymer fiber according to claim 1, wherein the finely divided titanium dioxide particles have an average primary particle diameter of from about 0.001 μm to about 0.2 μm.

3. The organic polymer fiber according to claim 1, wherein the finely divided titanium dioxide particles are in the form of a powder comprising primary dispersion particles produced by the gaseous phase reaction starting from a titanium halide.

4. The organic polymer fiber according to claim 1, wherein the amount of the porous calcium phosphate is in the range of from about 0.01% to about 50% by weight based on the weight of the finely divided titanium dioxide particles.

5. The organic polymer fiber according to claim 1, wherein the amount of the photocatalytic powder for environmental clarification is in the range of about 0.01% to about 80% by weight based on the total weight of the photocatalytic powder-supported organic polymer fiber.

6. An aqueous slurry of a photocatalytic powder for environmental clarification, said powder comprising finely divided titanium dioxide particles having a coating of porous calcium phosphate formed on at least part of the surface of each finely divided titanium dioxide particle, wherein an anionic surface active agent is present at least on the interface between said coating of porous calcium phosphate and the finely divided titanium dioxide particle.

7. The aqueous slurry according to claim 6, wherein the finely divided titanium dioxide particles have an average primary particle diameter of from about 0.001 μm to about 0.2 μm.

8. The aqueous slurry according to claim 6, wherein the finely divided titanium dioxide particles are in the form of a powder comprising primary dispersion particles produced by the gaseous phase reaction starting from a titanium halide.

9. The aqueous slurry according to claim 6, wherein the amount of the porous calcium phosphate is in the range of from about 0.01% to about 50% by weight based on the weight of the finely divided titanium dioxide particles.

10. A process for producing an aqueous slurry of a photocatalytic powder for environmental clarification, comprising dispersing finely divided titanium dioxide particles in an aqueous slurry containing an anionic surface active agent, and then forming a coating of porous calcium phosphate on at least part of the surface of each finely divided titanium dioxide particle.

11. The process for producing an aqueous slurry of a photocatalytic powder according to claim 10, wherein the aqueous slurry used for dispersing the finely divided titanium dioxide particles therein contains from about 0.02 part to about 20 parts by weight of the anionic surface active agent per 100 parts by weight of the finely divided titanium dioxide particles.

12. The process for producing an aqueous slurry of a photocatalytic powder according to claim 10, wherein the finely divided titanium dioxide particles have an average primary particle diameter of from about 0.001 $\mu$m to about 0.2 $\mu$m.

13. The process for producing an aqueous slurry of a photocatalytic powder according to claim 10, wherein the finely divided titanium dioxide particles are in the form of a powder comprising primary dispersion particles produced by the gaseous phase reaction starting from a titanium halide.

14. The process for producing an aqueous slurry of a photocatalytic powder according to claim 10, wherein a coating of porous calcium phosphate is formed on at least part of the surface of each finely divided titanium dioxide particle by contacting a pseudo substance solution containing at least calcium ion and phosphate ion with the finely divided titanium dioxide particles whereby porous calcium phosphate is deposited on at least part of the surface of each titanium dioxide particle.

15. The process for producing an aqueous slurry of a photocatalytic powder according to claim 14, wherein the pseudo substance solution has a calcium ion concentration of from about 0.1 mM to about 50 mM and a phosphate ion concentration of from about 0.1 mM to about 20 mM.

* * * * *